June 14, 1960 — R. HARMAN ET AL — 2,941,120
SPEED CONTROL OF ROTARY BLADED MACHINES
Filed May 13, 1957 — 2 Sheets-Sheet 2

INVENTORS
ROWLAND HARMAN
CLEDWYN WILLIAMS
BY Watson, Cole, Grindle & Watson
ATTORNEYS United States Patent Office 2,941,120
Patented June 14, 1960

2,941,120

SPEED CONTROL OF ROTARY BLADED MACHINES

Rowland Harman, Knebworth, and Cledwyn Williams, Warden Hill, Luton, England, assignors to D. Napier & Son Limited, London, England, a company of Great Britain Filed May 13, 1957, Ser. No. 658,751

Claims priority, application Great Britain May 14, 1956

5 Claims. (Cl. 317—5)

This invention relates to apparatus for controlling the speed of a bladed rotary machine such as a centrifugal pump and/or a fluid driven turbine. The invention is particularly applicable to small machines in applications where weight and space must be minimised, such as in a turbo-driven fuel pump for an aircraft rocket motor.

It is an object of the invention to provide improved speed controlling apparatus which will be light and compact and simple to manufacture and at the same time reliable in operation and accurate in respect to the controlled speed.

Speed controlling apparatus of the kind referred to according to the present invention therefore comprises an electro-magnetic pick-up device conected to the casing of the machine, and arranged to be sensitive to the changing magnetic conditions within the casing as the blades rotate, and to produce a pulsating electric signal having a frequency proportional to the speed of rotation of the machine, an electric frequency selective circuit associated with the pick-up device and speed control means actuated by the frequency selective circuit for controlling the speed of the machine.

The speed controlling means will normally operate by controlling the quantity of fluid passing through the machine itself, or through an associated machine rotating therewith.

In the case of a turbo-driven pump where the rotors of the turbine and the pump are connected to rotate at a fixed speed ratio, it will be understood that the pickup device may be connected to the casing of either part of the machine, whichever is the more convenient. Where the assembly includes a centrifugal pump however, the pick-up device will normally be connected to the casing of the pump since the blade formation of the centrifugal pump is particularly suitable for the purposes of the invention. The speed control however, is conveniently effected by controlling the quantity of fluid admitted to the turbine.

Preferably the pick-up device includes a pair of magnetic pole pieces, with associated windings, the free ends of these pole pieces being arranged adjacent the path of the moving blades.

According to a preferred feature of the invention the pick-up device comprises a permanent magnet located at least partly outside the casing, and two magnetically permeable probes which pass through spaced apertures in the casing making a fluid-tight seal therewith and have their inner ends arranged close to the path of the moving blades. Preferably the casing is split or slotted in a plane containing the two probes and this slot is filled with a solid electrical insulating substance, to reduce eddy currents in the casing. The free ends of the probes are moreover preferably so positioned that the angle subtended by them at the axis of the rotary machine is equal to the angle subtended by two blades of the machine. The frequency sensitive circuit preferably comprises a bridge with opposite sides having inductance and capacity characteristics and resistors connected through rectifiers to the points in the bridge between each inductance capacity pair. The resultant of the D.C. voltages developed across the resistors is then preferably applied between the base and emitter of a transistor amplifier, which is thus energised when the frequency of the pick-up signal exceeds a predetermined value.

The invention may be performed in various different ways but one specific embodiment will now be described by way of example, with reference to the accompanying drawings in which.

Figure 1:
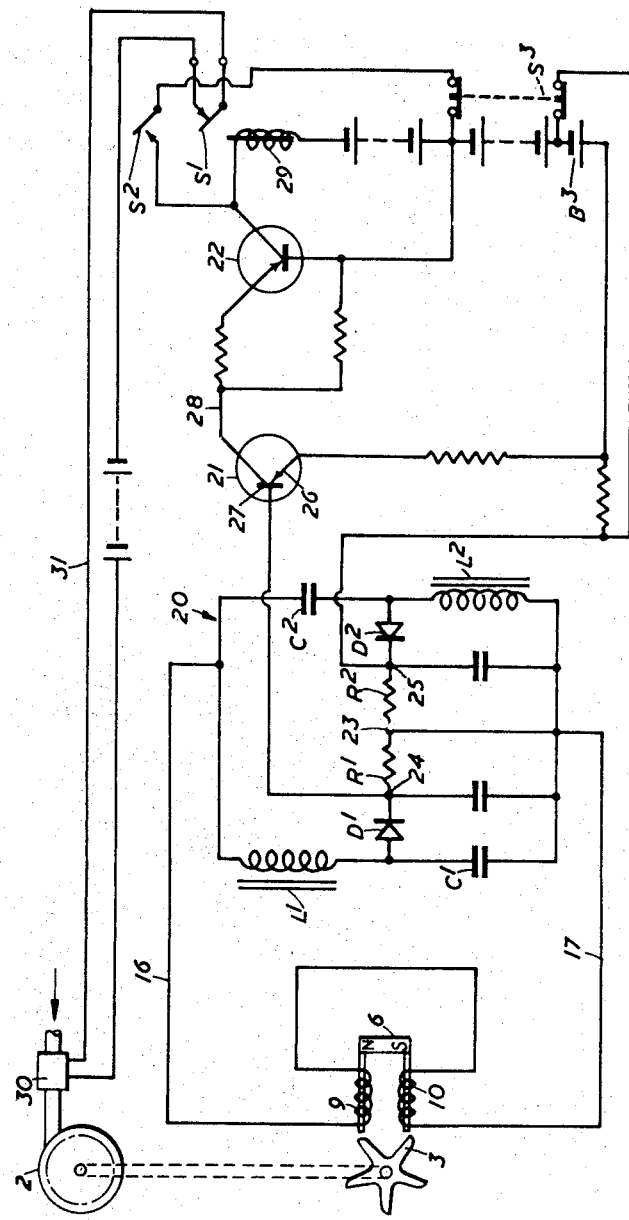
Figure 1 is a diagrammatic circuit lay-out of the control system.
Figure 2:
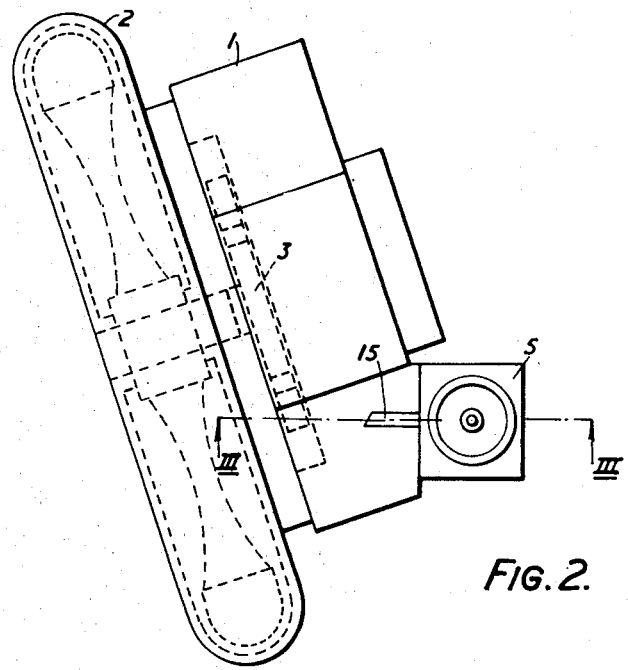
Figure 2 is a side elevation of turbo-pump unit.
Figure 3:
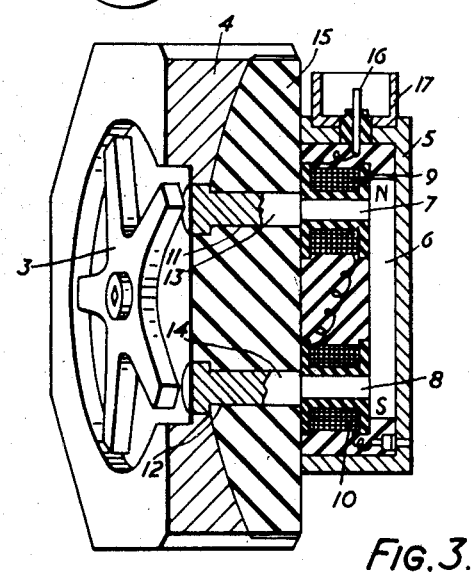
Figure 3 is a sectional view on the line III—III in Figure 2.

In this example of the invention the speed controlling apparatus is applied to a turbo-driven centrifugal fuel pump 1 forming part of an aircraft rocket motor. The fuel to be pumped in this case is paraffin and the turbine 2 is driven by a mixture of steam and oxygen at high pressure and temperature resulting from the decomposing of hydrogen peroxide in a catalytic decomposing chamber. The hydrogen peroxide is derived from the main hydrogen peroxide supply which constitutes the oxidant for the rocket motor.

If the load on such a turbo-pump should drop substantially or disappear the rotor assembly may accelerate rapidly to dangerously high speeds. The object of this example of the invention therefore is to provide an overspeed cut-out which will shut off or reduce the supply of motive fluid to the turbine if the speed exceeds a predetermined figure.

The pump 1 is of the centrifugal type and comprises five bladed impeller 3 of the free entry type, that is to say in which the blades are connected to one another only at their roots without side walls. Secured to the side of the pump casing 4 is an electro-magnetic pick-up unit 5 comprising a straight bar permanent magnet 6 with series wound windings 9, 10 on each of its two magnetically-permeable pole pieces 7, 8. The pump casing 4 is formed with two parallel drillings 11, 12 which extend inwards into the interior of the casing and are aligned with the pole pieces 7, 8 of the pick-up device when mounted in position on the casing. The casing itself is of aluminium, and the two drillings are plugged with a pair of probes 13, 14 formed of magnetically permeable material, the outer ends of which make close contact with the respective pole pieces. The casing is also formed with a slot or groove in a plane containing the two drillings and this slot is filled with a solid electrical insulating material 15, to prevent eddy currents circulating in the casing around the probes.

The blades of the impeller are also of a magnetically permeable material and the inner ends of the probes 13, 14 are spaced apart by a distance equal to the spacing between the tips of the blades. Thus when any pair of adjacent blades are aligned with the tips of the probes the reluctance of the magnetic circuit through the pick-up windings 9, 10 is reduced and the pick-up therefore generates a pulsating A.C. current with a frequency of 5 cycles for each revolution of the impeller. Thus an impeller speed of 25,000 r.p.m. will result in a pick-up output of 2,083 cycles per second.

Electrical connections 16, 17 to the windings on the pole pieces are led through a coaxial cable to an electronic frequency sensitive circuit housed in a separate control compartment. This circuit is illustrated in Figure 1 and comprises an inductance-capacity bridge circuit indicated generally at 20 fed by the pick-up unit, the output of the bridge being fed to a pair of transistor amplifiers 21, 22. As seen the two sides of the bridge circuit include inductances $L^1$, $L^2$ and capacitors $C^1$, $C^2$, arranged oppositely. The centre point 23 of the bridge is connected through resistances $R^1$, $R^2$, and diode rectifiers $D^1$, $D^2$ to the sides of the bridge between the inductances and capacitors. The alternating potential developed across capacitor $C^1$, is rectified by diode $D^1$ to produce a unidirectional potential across resistor $R^1$, whilst the alternating potential developed across inductor $L^2$ is rectified by diode $D^2$ to produce an opposing unidirectional potential across resistor $R^2$. Since the reactance of capacitor $C^1$ is inversely proportional to frequency, and that of inductor $L^2$ is directly proportional to frequency, it can be seen that for all applied frequencies below a predetermined value, the voltage across the resistor $R^1$ will be greater than that developed across $R^2$; at a particular frequency the two voltages will be equal and opposite; and for all frequencies above this predetermined value the voltage across $R^1$ will be less than the voltage across $R^2$.

As shown in the circuit diagram the resultant of the voltages developed across the resistors $R^1$, $R^2$ in the bridge (that is to say between the points 24, 25) is applied between the emitter 26 and base 27 of the transistor 21. The collector circuit 28 from this first transistor is fed into the second transistor 22 and the output of this is arranged to operate a relay winding 29. It will be understood that the transistors will only be energised when the emitter of transistor 21 is driven positive with respect to its base, that is to say when the pick-up output frequency exceeds the predetermined value. The relay 29 operates two switches $S^1$, $S^2$. The switch $S^1$ comprises the main contacts of a solenoid circuit 31 which actuates a valve 30 arranged to control the supply of motive fluid to the turbine 2. When switch $S^1$ is closed the fuel supply valve 30 is open. The switch $S^2$ when closed connects together the base and collector circuits of the transistor 22 and so ensures that the current though the relay winding 29 is maintained as soon as the relay winding has been energised, until such time as the whole circuit is de-energised. This switch $S^2$ thus prevents the main switch $S^1$ from reclosing to re-admit fluid to the turbine, after it has once been opened. A third switch $S^3$, which may be manually operated is arranged so that at all times except when it is opened to permit starting of the turbine, it will connect the base 26 of the first transistor 21 via the bridge circuit 20 to the negative side of a battery $B^3$, which is in practice of about 1.5 volts. When the turbine is running at a permitted speed a small negative bias is thus applied in series with the greater positive bias from the bridge, which latter holds the transistor 21 in a non-conducting state. If, however, the A.C. input to the bridge should fail during operation, due for example to a fault in the pick-up or its connecting wirings, the transistors 21 and 22 will automatically be activated and the main switch $S^1$ will open to shut off the fluid supply to the turbine.

What we claim as our invention and desire to secure by Letters Patent is:

1. A bladed rotary machine comprising a casing, a bladed rotor within the casing, the casing containing a fluid in motion therein in contact with the blades for imparting rotary movement to the rotor, and an apparatus for controlling the speed of the machine comprising an electromagnetic pick-up device including a pair of magnetic pole pieces located in the casing, the free ends of the pole pieces being so positioned that the angle subtended by them at the axis of the rotary machine is equal to the angle subtended at its axis by two blades of the machine, said pole pieces being thus operatively associated and cooperating with said blades to complete a magnetic circuit, and arranged to be sensitive to the changing magnetic conditions within the casing as the blades rotate, and to produce a pulsating electric signal having a frequency proportional to the speed of rotation of the machine, an electric frequency selective circuit associated with the pick-up device, and speed control means actuated by the frequency selective circuit and arranged to control the rate of fluid flow through the machine to control the speed of the machine.

2. A machine as claimed in claim 1 in which the pick-up device comprises a permanent magnet located at least partly outside the casing, and the two pole pieces comprise magnetically permeable probes which are connected at their outer ends to the magnet and pass through spaced apertures in the casing and make a fluid tight seal therewith, and have their inner ends arranged close to the path of the moving blades.

3. A machine as claimed in claim 2 in which the casing is slotted in a plane containing the two probes and this slot is filled with a solid electrical insulating substance to reduce eddy currents in the casing.

4. A machine as claimed in claim 1 in which the frequency sensitive circuit comprises a bridge with opposite sides having inductance and capacity characteristics respectively, and resistors connected through rectifiers to the points in the bridge between each inductance capacity pair.

5. A machine as claimed in claim 1 in which the blades of the rotary machine are formed of a material of high magnetic permeability.

References Cited in the file of this patent

UNITED STATES PATENTS

| 716,131 | Steinmetz | Dec. 16, 1902 |
| 1,872,243 | Churcher | Aug. 16, 1932 |
| 2,111,423 | Given | Mar. 15, 1938 |
| 2,542,638 | Desch | Feb. 20, 1951 |
| 2,669,669 | Spaulding | Feb. 16, 1954 |
| 2,728,893 | Bartelink | Dec. 27, 1955 |
| 2,772,378 | Farkas | Nov. 27, 1956 |